United States Patent [19]

Hove

[11] Patent Number: 5,263,572
[45] Date of Patent: Nov. 23, 1993

[54] VOLUMETRIC FEEDER WITH REMOVABLE AUGER DRIVE ASSEMBLY

[75] Inventor: Steven M. Hove, River Falls, Wis.

[73] Assignee: Tecnetics Industries, Inc., St. Paul, Minn.

[21] Appl. No.: 880,849

[22] Filed: May 11, 1992

[51] Int. Cl.$^5$ .............................. B65G 33/32
[52] U.S. Cl. ...................... 198/672; 198/657
[58] Field of Search .............. 198/657, 672, 673, 674; 222/412

[56] References Cited

U.S. PATENT DOCUMENTS

| | | | |
|---|---|---|---|
| 1,914,486 | 6/1933 | Burton | 198/674 X |
| 2,829,763 | 4/1958 | McCallum | 198/657 |
| 2,927,682 | 3/1960 | Dorris et al. | 198/674 |
| 3,080,045 | 3/1963 | Douglas | 198/672 X |
| 3,081,862 | 3/1963 | Knoedler | 198/674 |
| 3,127,008 | 3/1964 | Linde | 198/672 |
| 3,194,385 | 7/1965 | Barnese | 198/672 X |
| 3,602,552 | 8/1971 | Morgan | 198/672 X |
| 5,110,015 | 5/1992 | Kilts | 222/413 |

FOREIGN PATENT DOCUMENTS

| | | | |
|---|---|---|---|
| 2626196 | 12/1977 | Fed. Rep. of Germany | 198/672 |
| 0009610 | 1/1982 | Japan | 198/672 |
| 1479392 | 5/1989 | U.S.S.R. | 198/672 |

OTHER PUBLICATIONS

Tecweigh Volumetric Feeders—28 Series, copyright 1990.
Tecweight Volumetric Feeders—12 Series, copyright 1990.
Design Ideas for the Forsheda V-Ring, copyright 1986.

Primary Examiner—James R. Bidwell
Attorney, Agent, or Firm—Merchant, Gould, Smith, Edell, Welter & Schmidt

[57] ABSTRACT

A dry good material feeding apparatus is shown which includes a feed hopper having an auger housing portion with oppositely disposed openings. A bearing block is positioned in one opening carrying a removable drive shaft which is releasably connected to an auger extending through the other opening. A bearing assembly mounted to a housing carries a driven shaft removably interconnected to the drive shaft, and the bearing assembly and bearing block both have peripheral flanges which are connected by a removable clamp. The bearing block has an inner peripheral wall surrounding the drive shaft, and a V-ring seal is mounted on the drive shaft for rotation therewith, having a flexible lip engaging the peripheral wall.

12 Claims, 3 Drawing Sheets

VOLUMETRIC FEEDER WITH REMOVABLE AUGER DRIVE ASSEMBLY

BACKGROUND OF THE INVENTION

1. Field of the Invention

This invention relates to dry good material feeding devices which use an auger for dispensing or conveying powders and bulk dry materials. More particularly, this invention relates to an auger drive assembly having special shaft sealing means and wherein the assembly can be quickly taken apart and removed for inspection and cleaning.

2. Description of the Prior Art

Dry good material feeders of the type which are manufactured at Tecnetics Industries, Inc. of St. Paul, Minn., which is the assignee of this application, commonly include a hopper having an inclined storage area and a lower cylindrical portion for housing a rotating auger. The rotating auger conveys dry material such as a powdered food product from the inclined holding area through a cylindrical passage to a space outside of the hopper. A drive assembly is typically provided for the auger at the end of the auger which is opposite from the housing opening through which the dry material is conveyed.

When feeders of this kind are used to dispense or convey dry food products, special consideration must be given to the sanitary aspects of the feeder design. For example, the feeders may feature all stainless steel construction and a food-grade polyurethane hopper so that repeated wash downs are not a problem. Also, the hoppers are designed so that they have no cracks or ledges to collect material, and the entire assembly is engineered for quick disassembly for cleaning and repair purposes.

It is known that some type of seal must be placed between the drive mechanism and the rotating auger so that the dry material being conveyed does not escape into the drive mechanism. The problems encountered with drive shaft seals of this kind, and an improved sealing arrangement, are discussed and disclosed in the Harold J. Kilts U.S. Pat. No. 5,110,015, issued May 5, 1992, also assigned to Tecnetics Industries, Inc. Those discussions and disclosures are incorporated herein by reference.

A particular problem arises when dry good material feeding devices of this kind are used to dispense or convey food products used for human consumption. Government regulations require that all materials used in construction of the feeder must meet certain standards for cleanliness and sanitation. It is also necessary to be able to quickly and easily disassemble the unit, including the auger drive assembly, to permit it to be inspected and cleaned. The seal for the drive shaft must not only prevent the dry material from escaping into the drive mechanism but it must also be constructed of a material which will conform to government standards. Heretofore, a dry good material feeding device for dispensing or conveying food products used for human consumption and which will fully meet government standards including approval for food grade 3A has not been available to the industry. Specific drawbacks of prior art feeders have included the sealing arrangement, the material from which the seal is made, and the ease of disassembling, cleaning and inspecting the auger drive mechanism.

SUMMARY OF THE INVENTION

The present invention provides an improved auger drive assembly which utilizes some of the features shown in U.S. Pat. No. 5,110,015, but wherein the entire drive assembly can be more quickly disassembled, disconnected from the auger, and removed from the hopper. Superior sealing is provided by mounting a Forsheda V-ring seal on the rotating drive shaft in an arrangement which prevents leakage of dry material from the hopper into the auger drive assembly. The V-ring seal is constructed from a synthetic rubber material which has been approved by the U.S. Department of Agriculture and certified for 3-A sanitary use. As a result, the entire unit can be utilized in situations where full government approval is required or where extremely high sanitation and cleaning requirements are present.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT

Figure 1:
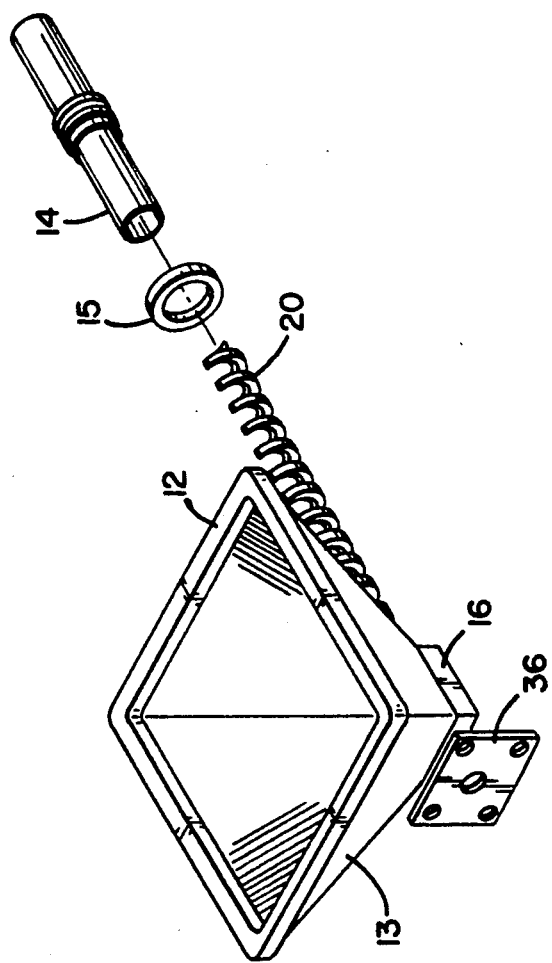
FIG. 1 is an exploded fragmentary view in perspective of selected components of a dry feeder according to the present invention.

Referring now to the drawings, wherein like reference numerals are used to designate like elements throughout the several views, and referring in particular to FIG. 1, there is disclosed a flexible hopper 12 which has an outer wall 13. Wall 13 defines a storage portion for holding dry material. Wall 13 guides the dry material downwardly toward a feed auger 20. Hopper 12 further includes a portion 16, which has a cylindrical space 18 defined therein, for housing the feed auger 20.

Auger member 20 is partially disposed within cylindrical space 18 and extends through portion 16 and an opening on an opposite side of hopper 12 from the cylindrical space 18. Mounted in that opening and surrounding auger 20 is a discharge tube 14 and associated sealing ring 15. Auger member 20 includes a shaft 22 and a helical flight 24 which preferably extends along the entire length of auger member 20.

Mounted within cylindrical space 18 is a cylindrical bearing block 25 having an outer diameter similar to the inner diameter of space 18 to provide a snug fit. Bearing block 25 has an axial opening 26 with a first diameter to accommodate a drive shaft 27 having a slightly smaller diameter. Bearing block 25 has a connecting member in the form of a peripherally extending flange 28 at an outer end thereof, positioned outside wall 13, the flange being circular and having a diameter larger than that of block 25. Axial opening 26 also extends through flange 28. An inner end of block 25 is provided with a relatively large diameter central opening 29 which in the preferred embodiment extends almost half the length of block 25. An inner end of central opening 29 terminates in a flat inner peripheral wall 30 lying in a plane perpendicular to the axis of axial opening 26 and surrounding the axial opening. Formed between central opening 29 and axial opening 26 is a seal chamber 31 having a diameter intermediate the diameters of openings 26 and 29 which terminates at its inner end in a second peripheral wall 31a which surrounds axial opening 26 and lies in a plane perpendicular to the axis thereof.

Mounted to a housing 35 is a mounting plate 36 which is bolted to housing 35. Mounting plate 36 carries a bearing assembly 37 on one side thereof facing bearing block 25, and a drive sprocket 38 on an opposite side thereof, connected by a driven shaft 39 which is secured to drive sprocket 38 and rotates within the bearings disposed within bearing assembly 37. Bearing assembly 37 is provided with oppositely disposed inspection ports 37a to permit visual inspection of the cleanliness of the bearing assembly.

The end of bearing assembly 37 which faces bearing block 25 has mounted thereon a connecting member in the form of a peripheral flange 40 which is larger in diameter than bearing assembly 37, which is circular, and which has the same diameter and configuration as flange 28.

Flanges 28 and 40 are both provided with peripheral grooves 28a, 40a, which face each other designed to accommodate a circular O-ring seal 41 mounted therebetween.

Figure 2:
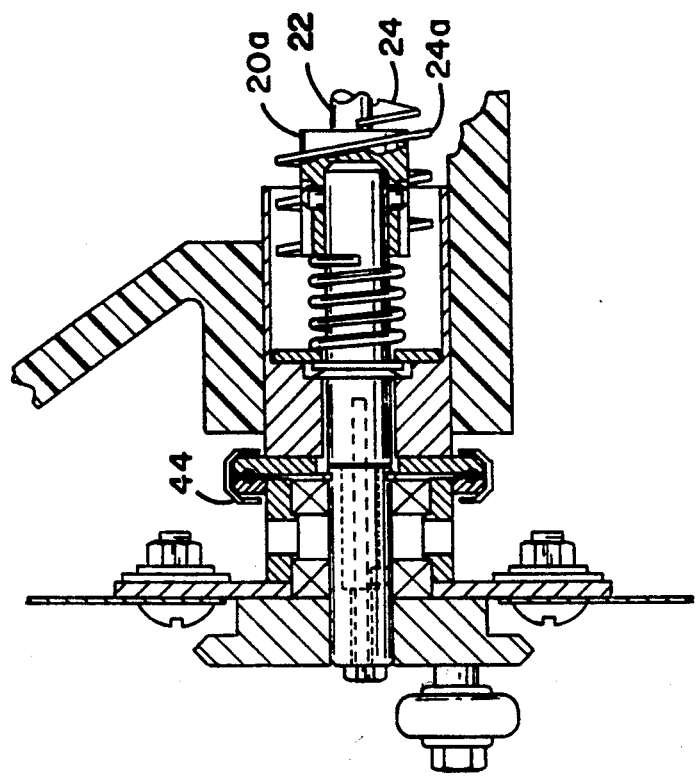
FIG. 2 is an enlarged fragmentary view in cross section of an auger drive assembly and auger mounted in the hopper and secured to an outer housing.

To assemble the unit, flanges 28, 40 are positioned against each other with O-ring seal 41 therebetween as shown in FIG. 2. Flanges 28, 40 have rounded, oppositely facing peripheral corners. To hold the flanges securely together, a removable clamping member 44 is provided having an inner, axially extending configuration corresponding to the outer axially extending configuration of the peripheral edges of the flange members, and being constructed and arranged to force or bias the two flanges together axially when the clamp is closed.

Figure 5:
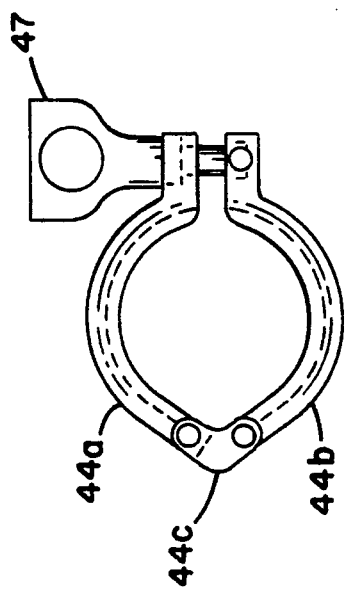
FIG. 5 is a side elevational view of the removable clamp shown in FIG. 2.
Figure 4:
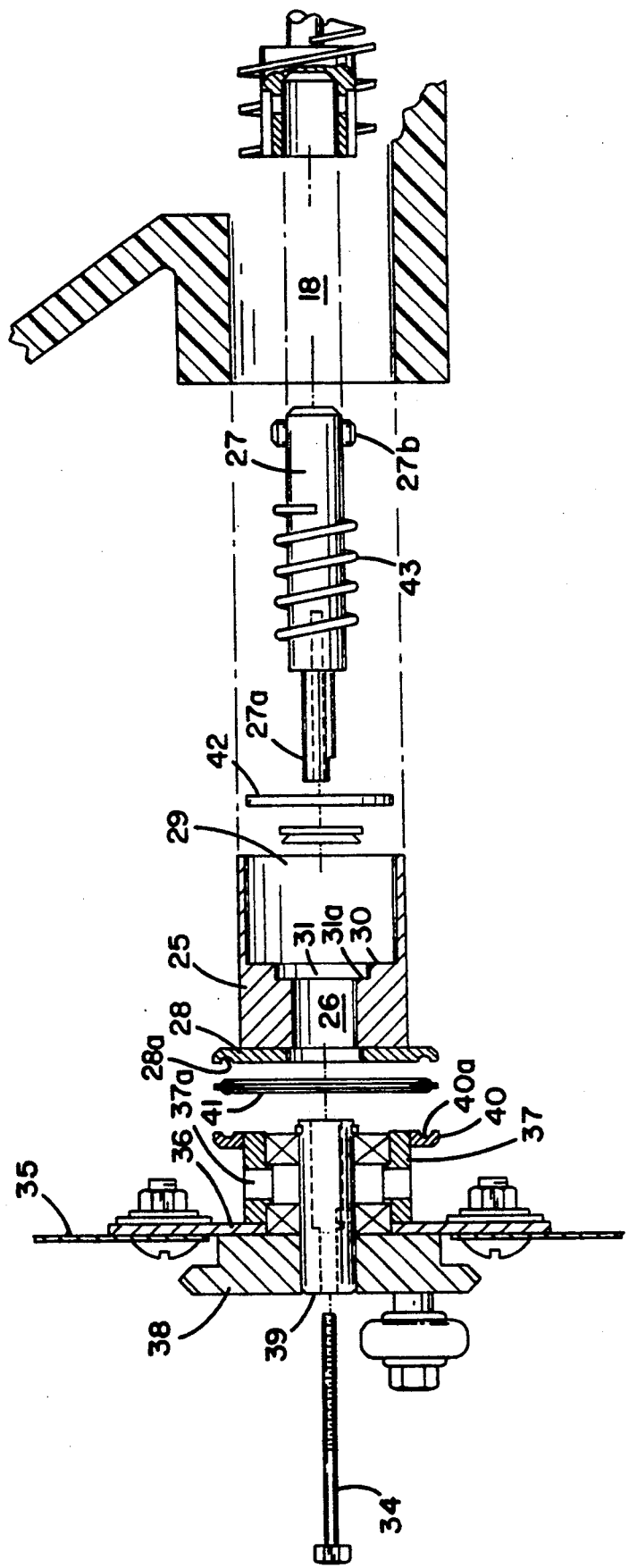
FIG. 4 is an exploded view of the assembly shown in FIG. 2.

As shown in FIG. 5, clamping member 44 has an upper curved member 44a and a lower curved member 44b connected by a suitable hinge 44c at adjoining ends thereof. The opposite ends are provided with aligned openings, the opening in member 44b being threaded, and are connected by a hand tightened wing nut 47. When clamping member 44 is placed over the adjoining flanges 28, 40, the flanges are drawn axially together as wing nut 47 is tightened.

Driven shaft 39 has an axial opening shown in phantom which is configured and keyed to accept a correspondingly configured and keyed extension 27a of drive shaft 27. Extension 27a is provided with an axial threaded opening to accommodate a threaded bolt 34 extending through driven shaft 39 to lock driven shaft 39 and drive shaft 27 together for common rotation.

The end of drive shaft 27 opposite extension 27a is provided with a pair of oppositely disposed pins 27b. The end of auger 20 is provided with an enlarged diameter collar 20a having a larger diameter flight 24a thereon extending into central opening 29. Collar 20a is provided with a central bore which is slotted and keyed to accommodate the end of drive shaft 27 and pins 27b so that auger 20 can be removably attached to drive shaft 27 for rotation therewith.

A washer-like spacer 42 having an outer diameter similar to the diameter of central opening 29 is mounted on shaft 27 against peripheral wall 30 and is held thereagainst by a coil spring 43 mounted on drive shaft 27 between spacer 42 and collar 20a. Spring 43 is compressed when the end of drive shaft 27 is inserted into the bore of collar 20a and connected therewith so that the spring continuously biases spacer 42 against peripheral wall 30.

Figure 3:
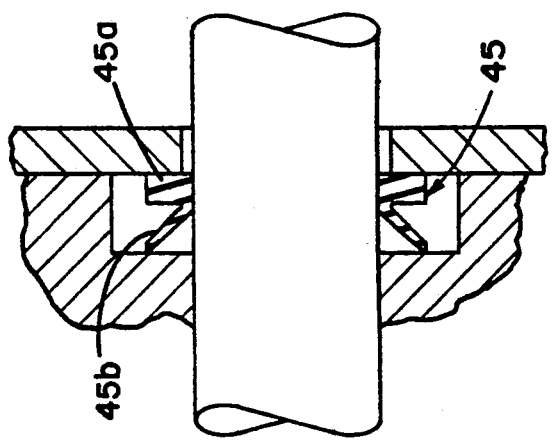
FIG. 3 is an enlarged fragmentary view in section of the seal for the drive shaft shown in FIG. 2.

Mounted on shaft 27 for rotation therewith within chamber 31 is a V-ring seal 45 having a ring-like body portion 45a and a flexible lip 45b having a circular tip which engages wall 31a as best shown in FIG. 3. Seal 45 is available from Forsheda Shaft Seal Corporation of Twinsburg, Ohio, and the preferred seal is constructed from synthetic nitrile rubber (neoprene). The diameter of the central opening of seal 45 is slightly smaller than the outer diameter of shaft 27 so that it stretches to mount on the shaft and is held in place by its own inherent tension. V-ring 45 thus rotates with the shaft and is designed to seal axially against a stationary counterface, with the precision flexible lip 45b. The preferred seal construction has the flexible lip 45b attached adjacent the central opening and flaring outwardly and upwardly at an angle of about 45 degrees to terminate in a circular lip which continually contacts and seals against wall 31a as the shaft rotates. Thus, any dry material in the hopper which leaks around or between spacer 42 and shaft 27 is prevented by V-ring seal 45 from moving further in the direction of the drive assembly.

It can be seen that spacer 42 provides backing for V-ring seal 45 and that the axial depth of chamber 31 is selected so as to provide the correct amount of pressure between the seal lip and wall 31a. The Forsheda V-ring is designed so that the sealing lip needs only a slight contact against the wall to achieve positive sealing.

When the unit is assembled and in place as shown in FIG. 2, means are provided to rotate drive sprocket 38 to in turn rotate shafts 39, 27, collar 20a and auger 20. Dry material in hopper 12 is carried by rotating flight 24 out of the hopper through discharge tube 14.

To disassemble the unit for inspection and cleaning, bolt 34 is removed to release drive shaft 27 from driven shaft 39. Clamping member 44 is then released and removed so that the flanges are released. Drive shaft 27 is detached from feed auger 20 and hopper 12 is tilted to permit bearing block 25 to be removed from the cylindrical space 18 in which it is mounted. Drive shaft 27 and spacer 42 can be removed from block 25 to permit further inspection and cleaning of the unit including seal 41. Thus, the entire assembly can be quickly and easily disassembled to facilitate inspection and cleaning.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A dry good material feeding apparatus, comprising:

a feed hopper having an outer wall defining a storage portion for holding dry material, and an auger housing portion, said auger housing portion having a first cylindrical space defined therein on a first side, and an oppositely disposed outlet, said first space and said outlet being substantially aligned and both extending through said outer wall;

a bearing block positioned in said first cylindrical space having an axial opening with a first diameter, a peripherally extending flange at an outer end thereof, and a central opening at an inner end thereof larger in diameter than said axial opening to define an inner peripheral wall surrounding said axial opening and further having a seal chamber formed between said openings having a diameter intermediate said other diameters to provide a second peripheral wall surrounding said axial opening;

a removable drive shaft extending through said axial opening and an auger member extending from said first cylindrical space through said outlet opening, means for releasably connecting said drive shaft to said auger member, and a washer-like spacer mounted on said drive shaft against said inner peripheral wall and held thereagainst by spring means on said drive shaft mounted between said connecting means and said spacer;

a V-ring seal mounted on said drive shaft, for rotation therewith, between said spacer and said second peripheral wall having a flexible lip engaging said second peripheral wall;

drive means including a bearing assembly having a second peripherally extending flange, a driven shaft rotatably mounted in said bearing assembly and means for removably interconnecting said driven shaft and said drive shaft;

an O-ring gasket mounted between said flanges, and removable clamping means for clamping said flanges together whereby said assembly can be quickly taken apart and removed for inspection and cleaning.

2. A dry good material feeding apparatus according to claim 1 wherein said bearing block is stationary to provide a stationary counterface for said flexible lip.

3. A dry good material feeding apparatus according to claim 2 wherein said V-ring seal is constructed of synthetic rubber and comprises a ring-like body having a central opening slightly smaller than the outer diameter of said drive shaft so that it stretches to mount on the shaft, and a flexible lip attached adjacent the central opening of said ring-like body and flaring outwardly and upwardly to terminate in a circular lip which continually contacts and seals against said second peripheral wall as said drive shaft rotates.

4. A dry good material feeding apparatus according to claim 1 wherein said flanges have rounded, oppositely facing peripheral corners and wherein said clamping means comprises a removable clamping member having an inner configuration corresponding to said outer configuration of said peripheral edges of said flange members constructed and arranged to force the two flanges together when said clamping member is closed.

5. A dry good material feeding apparatus, comprising:

a feed hopper having an outer wall defining a storage portion for holding dry material, and an auger housing portion, said auger housing portion having a first space defined therein on a first side, and an oppositely disposed outlet, said first space and said outlet being substantially aligned and both extending through said outer wall;

a bearing block positioned in said first space having an axial opening and having a connecting member at an outer end thereof positioned outside said outer wall;

a removable drive shaft extending through said axial opening and an auger member extending from said first space through said outlet opening, and means for connecting said drive shaft to said auger member;

a V-ring seal mounted on said drive shaft for rotation therewith, having a flexible lip for engaging said bearing block; and drive means including a bearing assembly having a connecting member, a driven shaft rotatably mounted in said bearing assembly, means for removably interconnecting said driven shaft and said drive shaft; and quickly releasable means for releasably holding said connecting members together.

6. A dry good material feeding apparatus according to claim 5 wherein said connecting members are peripheral flanges and wherein said last named means is a removable clamping member constructed and arranged to axially bias said flanges together when closed.

7. A dry good material feeding apparatus according to claim 6 wherein said bearing block has a central opening at an inner end thereof larger in diameter than said axial opening to define an inner peripheral wall surrounding said axial opening and further having a seal chamber formed between said openings having a diameter intermediate said other diameters to provide a second peripheral wall surrounding said axial opening, a washer-like spacer mounted on said drive shaft against said inner peripheral wall and held thereagainst by spring means on said drive shaft mounted between said connecting means and said spacer, and said seal being a V-ring seal mounted on said drive shaft for rotation therewith between said spacer and said second peripheral wall, said V-ring seal having a flexible lip engaging said second peripheral wall.

8. A dry good material feeding apparatus according to claim 7 wherein an O-ring gasket is mounted between said flanges, and wherein said clamping member is quickly removable whereby said assembly can be quickly taken apart and removed for inspection and cleaning.

9. A dry good material feeding apparatus, comprising:

a feed hopper having an outer wall and an auger housing portion, said auger housing portion having a first space defined therein on a first side, and an oppositely disposed outlet, said first space and said outlet being substantially aligned and both extending through said outer wall;

a bearing block removably positioned in said first space having an axial opening with inner and outer ends, connecting means at an outer end of said block, and an inner peripheral wall surrounding said axial opening at its inner end;

a removable drive shaft extending through said axial opening and an auger member extending from said first space through said outlet opening, and means for releasably connecting said drive shaft to said auger member;

a seal mounted on said drive shaft, for rotation therewith, having a flexible lip engaging said inner peripheral wall;

drive means including a bearing assembly having connecting means, a driven shaft rotatably mounted in said bearing assembly and means for removably interconnecting said driven shaft and said drive shaft; and removable clamping means for clamping said connecting means together whereby said assembly can be quickly taken part and removed for inspection and cleaning; and wherein said connecting means are peripheral flanges and wherein an O-ring gasket is mounted between said flanges.

10. A dry good material feeding apparatus according to claim 9 wherein said flanges have rounded, oppositely facing peripheral corners and wherein said clamping means comprises a removable clamping member having an inner configuration constructed and arranged to force said two flanges axially together when said clamping means is applied thereto.

11. A dry good material feeding apparatus, comprising:

a feed hopper having an outer wall and an auger housing portion, said auger housing portion having a first space defined therein on a first side, and an oppositely disposed outlet, said first space and said outlet being substantially aligned and both extending through said outer wall;

a bearing block removably positioned in said first space having an axial opening with inner and outer ends, connecting means at an outer end of said block, and an inner peripheral wall surrounding said axial opening at its inner end; a removable drive shaft extending through said axial opening and an auger member extending from said first space through said outlet opening, and means for releasably connecting said drive shaft to said auger member;

a seal mounted on said drive shaft, for rotation therewith, having a flexible lip engaging said inner peripheral wall;

drive means including a bearing assembly having connecting means, a driven shaft rotatably mounted in said bearing assembly and means for removably interconnecting said driven shaft and said drive shaft; and removable clamping means for clamping said connecting means together whereby said assembly can be quickly taken apart and removed for inspection and cleaning; and wherein said bearing block is stationary to provide at said inner peripheral wall a stationary counterface for said flexible lip.

12. A dry good material feeding apparatus, comprising:

a feed hopper having an outer wall and an auger housing portion, said auger housing portion having a first space defined therein on a first side, and an oppositely disposed outlet, said first space and said outlet being substantially aligned and both extending through said outer wall;

a bearing block removably positioned in said first space having an axial opening with inner and outer ends, connecting means at an outer end of said block, and an inner peripheral wall surrounding said axial opening at its inner end;

a removable drive shaft extending through said axial opening and an auger member extending from said first space through said outlet opening, and means for releasably connecting said drive shaft to said auger member;

a seal mounted on said drive shaft, for rotation therewith, having a flexible lip engaging said inner peripheral wall;

drive means including a bearing assembly having connecting means, a driven shaft rotatably mounted in said bearing assembly and means for removably interconnecting said driven shaft and said drive shaft; and removable clamping means for clamping said connecting means together whereby said assembly can be quickly taken apart and removed for inspection and cleaning; wherein said seal is a V-ring seal.

* * * * *